United States Patent [19]

Koruga

[11] Patent Number: 5,640,705

[45] Date of Patent: Jun. 17, 1997

[54] METHOD OF CONTAINING RADIATION USING FULLERENE MOLECULES

[76] Inventor: Djuro L. Koruga, 2525 N. Los Altos, Suite #312, Tucson, Ariz. 85705

[21] Appl. No.: 585,890

[22] Filed: Jan. 16, 1996

[51] Int. Cl.$^6$ .................................................... G91F 9/00
[52] U.S. Cl. .................... 588/16; 252/625; 976/DIG. 385
[58] Field of Search ....................... 588/2, 16; 252/625; 976/DIG. 385

[56] References Cited

U.S. PATENT DOCUMENTS

| | | | |
|---|---|---|---|
| 5,300,203 | 4/1994 | Smalley | 204/157.41 |
| 5,350,569 | 9/1994 | Coppa | 423/251 |

OTHER PUBLICATIONS

Dayton et al., "Buckyballs 'covered by old patent'", New Scientist, 6 Jul. 1991, p. 26.

Kroto et al., "$C_{60}$: Buckminsterfullerene," Nature, vol. 318, Nov. 14, 1985, pp. 162–163.

Kratschmer et al, "Solid $C_{60}$: A New Form of Carbon," Nature, vol. 347, 27 Sep. 1990, pp. 354–358.

Koruga et al., "Fullerene $C_{60}$," History, Physics, Nanobiology, Nanotechnology, North–Holland, 1993, pp. 122, 285–286, 288.

Chai et al., "Fulerenes With Metals Inside," The Journal of Physical Chemistry, vol. 95, No. 20, 1991, pp. 7564–7568.

Wang et al. "The Electronic Structure of $Ca@C_{60}$,"Chemical Physics Letters, vol. 207, Nos. 4, 5, 6, 28 May 1993, pp. 354–359.

Weaver et al, "Tubes, Capsules, and Onions," Solid State Physics, vol. 48, pp. 95–98, 100, 102–107.

Guo et al., "Uranium Stabilization of $C_{28}$: A Tetravalent Fullerene," Science, vol. 257, 18 Sep. 1992, pp. 1661–1664.

"Laser Interactions with Atoms, Solids, and Plasma," Plenum Press, New York, 1994, pp. 202, 221–224.

"Radioactive Waste Forms for the Future," Hahn–Meitner–Istitut. Berlin, 1988, pp. v–xi, 700–724.

Stewart, "Data for Radioactive Waste Management and Nuclear Applications," A Wiley–Interscience Publication, New York pp. vii–x, 34–39.

Springborg et al., "Density–Functional Calculations of Electronic and Structural Properties of Small Fullerene Tubules," Chemical Physics Letters, 225 (1994) pp. 454–461

Pasqualini et al, "Nanometric Nuclear Product Conformed by Radioactive Material Encapsulated in Carbon and Methods to Obtain It", Oct. 10, 1995 presentation.

*Primary Examiner*—Ngoclan Mai
*Attorney, Agent, or Firm*—Cushman, Darby & Cushman Intellectual Property Group of Pillsbury, Madison & Sutro

[57] ABSTRACT

This specification presents methods of containing/absorbing alpha, beta, gamma, X-ray, and neutron radiation using Fullerene molecules employing the resonant relativistic absorption phenomena based on a frequency dependant Doppler effect. Radioactive atoms, ions, and molecules ($X_{rad}$) are encapsulated in a variety of Fullerene molecules ($C_{60}$, onions, nanotubes, and capsules). The resulting radioactive material-holding Fullerene complexes ($X_{rad}@C_n$) will either decrease the intensity of escaping internally-generated radioactive emissions or, in certain optimal cases, absorb and/or contain all such internally-generated radioactive emissions which occur as the radioactive material decays.

20 Claims, No Drawings

METHOD OF CONTAINING RADIATION USING FULLERENE MOLECULES

1. Field of the Invention

The placement of radioactive matter inside Fullerene cages is detailed in the present invention. This radioactive matter, including nuclear waste or specifically chosen radioactive material, and the radiation emitted by such matter is completely contained with the cages (radiation containment depends primarily on the cage structure chosen and conditions of storage), thus providing an attractive long-term disposal option. Predetermined release of the emitting radiation is also discussed. The present invention relates to means and products that securely store radioactive materials while minimizing harmful radioactive emissions to the surrounding environment.

2. Background of the Invention

The secure long-term disposal of radioactive nuclear waste has become a critical issue throughout the world. Virtually every advanced country has developed its own, often times elaborate, approach to long-term storage and safe disposal of radioactive wastes. Currently, the United States plans to store radioactive wastes inside glass, ceramic, concrete, or clay containment vessels. These vessels are designed to contain the dangerous radioactive materials for hundreds of years.

Given the dangers associated with radioactive emissions from nuclear wastes, merely containing these wastes within containment vessels is not enough. Indeed, given the known dangers of radiation posted by storing radioactive wastes, the U.S., in an effort to minimize radiation dangers, plans to bury these radioactive containment vessels deep within the earth in geologically secure environments (e.g., natural salt bed formations). However, these extravagant storage sites are extremely expensive to develop, operate, and maintain. Moreover, there are real ethical considerations involved in planning for the safe storage of waste products with hazardous half-lives several times longer than the longest known enduring human civilization. For example, the gamma radiation half life of $^{238}$U is $4.51 \times 10^9$ years, and $^{244}$Pu has a beta radiation half life of $7.6 \times 10^7$ years. The issue that must be addressed is how to ensure the safety of the present and future generations from high energy ionizing radiation produced by nuclear waste. This is an issue of concern not only for the scientific community, but for the general public as well. In fact, the problem of proper and safe nuclear waste disposal is perceived as having no viable solution. Simply put, people are afraid of plans to store radioactive wastes anywhere near them, and the selection of an appropriate storage site has triggered several intense legal and political debates.

In an effort to address the problems of storing nuclear wastes, another group of researchers patented the structural benefits of Fullerene molecules and their advantageous use for storing waste materials based on the structural and chemical properties of the entire class of Fullerenes. This approach is disclosed in U.S. Pat. No. 5,350,569, issued to Nicholas V. Coppa, September, 1994 (referred to as the Coppa patent). Recognizing the inherent structural strengths of Fullerene molecules, the Coppa patent teaches storing nuclear wastes inside Fullerene molecules. In particular, the Coppa patent refers to the structural and chemical properties that make Fullerenes suitable as a storage mechanism and criticizes the known radioactive waste storage method (e.g., metal ions in a glass matrix) as being prone to structural damage such as that damage caused by radioactive decay.

A second, related research effort aimed at radioactive waste storage utilizes very large Fullerene cages (Giant Onions or Nanotubes) to encapsulate radioactive material. The large molecular soots created in this approach typically measure hundreds of nanometers across and do not rotate. The results of this research were recently patented in Argentina (Act No: 0333793, date of issue Oct. 10, 1995) by Dr. Enrique Pasqualini et al. (referred to as the Pasqualini patent). Significantly, both the Coppa and Pasqualini patents fail to teach 1) how to use certain specific Fullerene cages to contain internally-generated radioactive emissions, 2) which Fullerene cages will contain or decrease such radioactive emissions, or 3) the external physical conditions necessary for sustaining the radiation containing/absorbing properties of the $X_{rad}@C_{60}$ Fullerenes. Indeed, complete protection from radiation via classical absorption (as in these two related patents) into static hexagonal carbon lattices would require material cross sections measured in meters.

In a more distantly related use of Fullerene cages, Australian scientist Bill Bruch of the National University in Canberra uses Fullerene carbon cages as a medical imaging agent introduced into live tissue. The giant Fullerenes used by Bruch have 540 or more carbon atoms with the radioactive material, technetium (Tc), inserted into the large hollow interior of the cages. The technique is called "Technegas," a name derived from the method used to obtain images of the interior of the lungs. Prior to imaging, the subject inhales a gas laced with $Tc@C_{540+}$, which lodges in the lungs. The radiation of the technetium is detected using a camera sensitive to gamma rays, thereby producing an image of the interior of the lungs. Today, there are about 150 Technegas systems in use in 18 countries around the world including the UK, Germany, France, Italy, and Japan. However, like the Coppa and Pasqualini patents, the "Technegas" approach fails to teach the use of Fullerene cages to contain internally-generated radioactive emissions.

3. Relevant Fullerene Background Information

In September 1990, for the first time since the discovery of Fullerenes in 1985, the Huffman/Kratschmer research team developed a method to produce macroscopic amounts of solid $C_{60}$ via electric arcs (Patent Application Number #PCT/US91/05983, Filing Date Aug. 21, 1991). This development stimulated a large amount of new research on Fullerenes and their possible uses in the scientific and technological community. Several Fullerene production methods now exist.

3.1 Basic Relevant Fullerene Properties

The geometrical structure of Fullerene molecules must have exactly 12 pentagonal faces, but may have any number (except 1) of hexagonal faces. Exact icosahedral symmetry (called Ih symmetry) is possessed by a special subset of the Fullerenes. The first four Fullerenes with Ih symmetry are: $C_{20}$, $C_{60}$, $C_{80}$, and $C_{140}$. $C_{60}$, the quintessential Fullerene, is named Buckminsterfullerene. Fullerenes are described by the general formula $C_{20\ +2H}$, where H is the number of hexagonal faces.

For $C_{60}$, both theoretical calculations and Scanning Tunneling Microscopy (STM) experiments have shown that electron currents exist in the molecule's pentagons and hexagons. Calculated ring current chemical shifts, based on London theory, show the existence of remarkable "pi" electron ring currents in the pentagons. STM experiments demonstrate both a high level surface energy concentration in the pentagons and the closed-shell electronic structure of $C_{60}$. Thus, $C_{60}$ is unique among the Fullerenes, possessing an electronically closed shell with a very high concentration of energy in the pentagons.

Electronic closure for a Fullerene molecule means that the electron cloud surrounding the molecule is continuous.

In single layer Fullerenes other than $C_{60}$, the hexagons are regions which are not electronically closed. For $C_{60}$, the combination of perfect Icosahedral Symmetry and an electronically closed shell gives the $C_{60}$ molecule the properties of a "big atom."

3.2 Fullerenes Can Encapsulate Other materials

Shortly after the Huffman and Kratschmer discovery, researchers, including the present inventor, found that the electronically closed shell structure of the $C_{60}$ Fullerene molecule results in an included space completely void of all matter, providing an absolutely pure vacuum. Later, using different methods of fabrication, it was discovered that metal ions could be inserted into the Fullerene's internal hollow centers, a process commonly referred to as "doping" the Fullerene. Multiple methods of producing "doped" Fullerenes are possible, thereby creating another entire new series of materials. Because the volume of an empty $C_{60}$ molecule is larger than any atom in the periodic system of elements, all possibilities for forming $M@C_{60}$ complexes should exist. (Note: the @ symbol indicates that the metal atom, M, is inside the $C_{60}$ cage.)

For example, macroscopic quantities of Fullerenes containing a metal atom were first produced using lanthanum atoms. This was accomplished by laser vaporization of a $La_2O_3$ on graphite composite rod in a 1200° C. tube furnace. Other methods of forming doped $M@C_{60}$ Fullerenes include using a laser vaporization/high temperature furnace technique in which a CaO/graphite rod is fabricated by mixing graphite powder and graphitic cement resulting in the formation of $Ca@C_{60}$ complexes. Efficient production methods for doping Fullerenes are still in development.

3.3 Fullerene Tubes, Capsules, and onions

Fullerene capsules and nanotubes are cylindrical carbon molecules with structurally closed cages. Capsules have hemispherically closed ends, with each end having six pentagons (the same as ½ of a Buckminsterfullerene). Nanotubes are closed on one end with a six pentagon hemisphere, but remain open on the other end. Fullerene capsules range from 2 nm to 100 nm in length. Nanotubes range from 1 nm to 100 nm in diameter and from 0.1 microns to 10 microns in length. Capsules and nanotubes can be formed as concentric multi-layer or single-layer shells. Because of their shorter lengths, capsules may be nested as inner layers within either larger capsules or nanotubes.

Fullerene onions are multi-layered spherical carbon cage structures with exactly 12 pentagons in each layer. The pentagons are located on the icosahedral axes and the number of hexagons varies. Between any two layers (shells), the effects of van der Waals attractions work out an optimized relative position and spacing.

4. Radiation Background Information

Nuclear materials give off five (5) main types of radiation: 1) alpha radiation (a helium nucleus with a velocity of about $10^9$ cm/s), 2) beta radiation (a high velocity negative electron, the velocity of some beta particles is as great as 0.996 that of the speed of light), 3) gamma radiation (electromagnetic radiation of a very short wavelength and high energy that is released when a neutron strikes a proton), 4) X-rays (radiation of an extremely short wavelength, very high energy, and often associated with electromagnetic waves), and 5) neutron radiation emitted by certain radioactive materials (similarly high energy but less common). These five types of ionizing radiation are referred to here as "harmful radiation." Even after radioactive material has been securely stored within large containment vessels, the existence of these harmful emissions requires that additional measures be taken to protect against a future release of harmful radiation.

5. Objects of the Present Invention

Although the Coppa patent discloses "doping" Fullerenes with metal ions as a way of storing radioactive materials, the processes described will not remove the dangers posed by the radiation emitted from these waste-in-Fullerene complexes. Indeed, in order to safely and consistently eliminate the harmful high energy radiation, it is necessary to consider the radiation emitted from the specific waste stored, the exact Fullerene molecule used, and the conditions under which the molecule is maintained. This is accomplished by identifying the specific useful properties of different classes of Fullerenes and applying them toward desired outcomes.

Thus, one object of the present invention is to provide a means for storing radioactive wastes or other radioactive materials while containing, absorbing, trapping, or suppressing the harmful radioactive emissions generated by the decay of the stored material. The containment of these radioactive emissions minimizes the radiation dangers and obviates the need to create the elaborate underground storage sites currently contemplated.

It is another object of the present invention to provide a means to store radioactive wastes or other radioactive materials while reducing and/or redirecting the external emission of the harmful radiation released from the nuclear storage molecule.

Other objectives and additional beneficial features of the invention are set forth in the following description.

SUMMARY OF THE INVENTION

The invention provides a method for containing/ absorbing all types of high energy ionizing radiation using Fullerene molecules. Under certain conditions, the harmful radiation emitted from atoms, ions, and/or molecules of radioactive materials encapsulated within Fullerene molecules may be decreased or eliminated. A storage molecule described herein will prevent the release of harmful radiation far into the future.

DETAILED DESCRIPTION

The present invention provides a means and mechanism by which radioactive materials may be permanently isolated from their external environment while simultaneously reducing or eliminating the hazards presented by radioactive emissions from these materials. Central to the invention is the precise knowledgeable utilization of Buckminsterfullerenes and Fullerenes.

There are three main types of Fullerene molecules that can be successfully employed to reduce or eliminate emitted radiation. One Fullerene molecule in particular, the sixty carbon atom Buckminsterfullerene molecule (designated $C_{60}$), is used as the primary storage molecule in order to contain all of the harmful, high energy ionizing nuclear radiation emitted from the stored radioactive material. In addition, Fullerene onions, and Fullerene nanotubes and capsules can also be used to reduce the harmful, high energy ionizing radiation.

1.0 Buckminsterfullerene, $C_{60}$, the Perfect Fullerene Completely Contains Radiation $C_{60}$ is the only single-layer Fullerene molecule that will completely contain high energy ionizing radiation. Under specific temperature and pressure conditions, $C_{60}$ can completely absorb the five main types of harmful, high energy, ionizing radiation; namely, alpha, beta, gamma, X-ray, and neutron radiation. Although the ability to partially absorb harmful radiation from encapsulated radioactive material is shared by a variety of Fullerenes, only the $C_{60}$ molecule can contain (contain or absorb) the harmful external radiation via frequency dependent Doppler-based effects. For radiation originating inside of a quickly spinning $C_{60}$ molecule, the classical superposition of radiation does not exist. It is replaced by the relativistic superposition of radiation. This containing/absorbing mechanism is referred to herein as "resonant relativistic absorption."

To grasp how this method of containing/absorbing radioactive emissions works, it is necessary to thoroughly understand three key points about Fullerenes. These three key points are:

1) $C_{60}$ has a unique 3-dimensional spherical structure that possesses an electronically closed shell, 2) $C_{60}$ possesses a perfect vacuum inside its molecular cage large enough to hold up to 2 atoms (or, oftentimes, many ions) of any element from the periodic table including large radioactive elements such as uranium or plutonium, and 3) $C_{60}$ rotates, with same probability in all directions, at very high speeds (between ten and thirty billion times per second), in vacuum, gas phase, liquids, and solid state.

If maintained under appropriate conditions, then because of these three key points, $C_{60}$ exhibits what is termed here "resonant relativistic absorption phenomena" to effectively contain all harmful radiation.

1.1 $C_{60}$ Contains a Wide Range of Harmful Radiation

The ability of $C_{60}$ to effectively absorb or contain internally emitted radiation is described herein for all five harmful radiation types: alpha, beta, gamma, x-rays, and Neutrons.

The alpha radiation emitted by an encapsulated radioactive material will be contained within the $C_{60}$ storage molecule. An alpha particle is equivalent to a helium nucleus, a two proton and two neutron complex. Classically, alpha radiation is the easiest radiation to absorb. With $C_{60}$ as the storage molecule, the absorption of alpha radiation can be accomplished in a relativistic way based on the Doppler effect.

Based on a preliminary calculation of the electron affinity of the Uranium-$C_{60}$ complex, the interactions between the Uranium and the inside of the $C_{60}$ will be strongly covalent, because the binding energy is 1.87 eV lower than in the normal covalent state of $UO_2$. This means that the Uranium will be in a fixed position on the inside surface of the $C_{60}$ cage. Furthermore, two 7s electrons and one 6d electron will go to the $T_{1u}$ molecular orbital of $C_{60}$, increasing the electronic density of the cage. This is a clear indication that the ground state of U@$C_{60}$ complex is $^3T_{1u}$. However, due to the presence of the uranium atom inside the cage, there will exist an alpha particle that will take two electrons from the $H_u$ molecular orbital of $C_{60}$.

Because Fullerene $C_{60}$ rotates very fast under the appropriate conditions ($3\times10^{10}$ s$^{-1}$ in solid state), and because the alpha particles move in radial direction (at about $10^9$ cm/s), the two moments act together as an orthonormal one and will have coupling constant bonds in a space-time system with a single point. These coupling phenomena lead to a "soft touch" between the electronic surface of the cage interior (de-localized "pi" electrons) and the alpha particle.

A significant contribution to the formation of the "soft touch" comes from the polarization energy generated by the high spin rates of the cages. The alpha particle is weakly neutralized (a "false helium") and moves around on the inside cage surface. Based on the initial energy of the alpha particle (about 4 MeV), the Fullerene rotation, and the weak interaction with the de-localized electronic cloud, the "false helium" will stay trapped moving inside the $C_{60}$ cage. The radioactive alpha emission from the encapsulated radioactive material will be forever contained within the Fullerene molecule.

The quickly spinning $C_{60}$ Fullerene will also contain the beta radiation emitted from the encapsulated materials. Beta radiation originates as an electron released from the nucleus when a neutron is converted into a proton. Beta particles, being fast-moving electrons, contain energy of up to about $1.6\times10^{-13}$ J. Because beta particles have a much smaller mass than other charged particles, they attain velocities that are an appreciable fraction of the speed of light (0.97 to 0.999 % of the speed of light).

There is an important difference between classical absorption, which employs a fixed absorber, and relativistic absorption (based on the Doppler effect), in which case the absorber is rotating at speeds approaching the speed of the radiation (light). In this latter situation, there will exist both time resonant phenomena and the transfer of energy from a very fast electron (beta radiation) to $C_{60}$ and from $C_{60}$ to a delocalized energy shell around the $C_{60}$. This is the "resonant relativistic absorption" referred to above.

In the case of beta radiation, the relativistic phenomena first leads to the absorption of the beta radiation (increased rotation) and then to a re-distribution in a delocalized electron shell. The maximum energy that can be absorbed via conventional absorption (Ea) by $C_{60}$ in its unoccupied orbitals is only about 320 eV (sixty electrons in eight molecular orbitals $T_{2g}$, $G_u$, $G_g$, $H_u$, $T_{2u}$, $H_g$, $T_{1g}$, and $T_{1u}$ with 48, 60, 52, 55, 30, 48, 15, and 12 eV, respectively). This classically absorbed energy will increase both the ring current in the pentagons and hexagons, and will increase the volume of the $C_{60}$. The rise in ring currents will also slightly increase the rotation speed of the $C_{60}$ molecule. However, the total amount of beta radiation energy absorbed in this manner is minimal. Thus, the majority of beta radiation energy must be absorbed by the $C_{60}$ molecule via resonant relativistic absorption.

As referenced before, the ability of $C_{60}$ to use relativistic absorption to absorb harmful radiation essentially depends on the storage molecule's rotation rate. Experimental evidence indicates that $C_{60}$ rotates at $1.8\times10^{10}$ s$^{-1}$ in solution (Tolvene and at $3.0\times10^{10}$ s$^{-1}$ in solid state. The energetic sources of this rotation are the ring currents in the 12 pentagons and 20 hexagons.

The relativistic resonant aspects of containing beta radiation within $C_{60}$ necessitate consideration of the energy relation through the law of energy conservation ($E_{initial} = E_{final}$). The radiation energy (Er) inside the $C_{60}$, the absorption energy of the $C_{60}$ (Ea), and the external energy in a delocalized electronic cloud of the $C_{60}$ (Eh) are related to one another by the energy conservation law as Er=Ea+(K× Eh), where:

$$K = \sqrt{1 - (v_r/\omega C_{60Rot})^2}$$

In the above expression, $v_r$ is speed of radiation (space–time phenomena), and $\omega$ is $C_{60}$ rotation (time phenomena).

For the resonant relativistic absorption phenomena, the main feature is K, which depends on the dielectric permittivity k. Because the inside of $C_{60}$ is a perfect vacuum, the permittivity ($e_0$) is $8.854\times10^{-12}$ $C^2N^{-1}m^2$. Keeping in mind that the radiation energy (Er) and the external delocalized electron cloud (Eh) have similar values, then the dielectric permittivity (Er/Eh) of the $C_{60}$ electronic shell is approximately equal to 1, or slightly less than 1, with the difference ranging from a $1 \times 10^{-10}$ to $10^{-20}$ value.

The general equation for the relativistic relationship between frequencies measured in two reference frames is given by the relativistic Doppler equation:

$$f_h = f_r x \frac{\sqrt{1 - \left(\frac{v^2}{c^2}\right)}}{1 - \left(\frac{v^2}{c^2}\right)\cos\alpha}$$

The relationship between frequencies measured in two reference frames that are moving perpendicularly, such as is the case in $U@C_{60}$ complexes ($\alpha = \pi/2$, $\cos\alpha = 0$), is:

$$f_h = f_r x \sqrt{1 - \left(\frac{Vr^2}{c^2}\right)}$$

When one reference frame ($C_{60}$) rotates very fast ($3 \times 10^{10}$ s$^{-1}$) around a source of radiation, while another reference frame (radiation) travels close (slighly less than) to the speed of light ($3 \times 10^{10}$ cm/s), a phenomena, referred to here as a resonant relativistic absorption, occurs in the space of 1 cm from the source of radiation. This phenomena is expressed as:

$$f_h = f_r x \sqrt{1 - \left(\frac{v_{r(1cm)}}{\omega_{c_{60}}}\right)^2} = 10^{20} \times$$

$$\sqrt{1 - \left(\frac{3 \times 10^{10} - (3 \times 10^{10} \times 10^{-20})}{3 \times 10^{10}}\right)^2} = 1.41 \times 10^{10} [s^{-1}]$$

Accordingly, the key points regarding the relativistic absorption of beta radiation (frequency of about $10^{20}$ s$^{-1}$) are the $C_{60}$ rotation rate (remarkably high) and the delocalized electronic cloud (very large at approximately 1 cm radius, with a frequency approximately $1.41 \times 10^{10}$ s$^{-1}$) of the $X_{rad}@C_{60}$ complex. These properties are central to permitting the use of $C_{60}$ as a storage molecule which can protect the external environment from the internally-generated harmful beta radiation.

Turning to gamma radiation, from the nuclear waste radiation perspective, gamma rays can be conceived of as particles of light or as bundles of energy (photons). The gamma ray can be imagined to be either a burst of energy (a particle) or a wave that represents part of the binding energy difference between the nucleus that disintegrates and the subsequent nucleus that is formed.

There are three additional main types of gamma radiation generated by other particle interactions. These three secondary forms of gamma radiation are produced by: 1) the Compton scattering effect, 2) the photoelectric effect, and 3) the electron-positron pair production. Of the three types of Gamma radiation produced by such particle interactions, only the photoelectric effect is possible within a Fullerene.

The photoelectric effect is produced when a gamma photon hits an orbital electron of an atom and transfers its energy to the electron, which then shoots out into an outer shell. As the affected electron springs back to its original position, energy is re-radiated as gamma radiation of a longer wavelength than the original gamma radiation.

The longer wavelength gamma photons created by this effect will have much less penetrating power than the original gamma rays that created them and, therefore, are classically easier to absorb. In the case of nuclear materials encapsulated in Fullerenes, both the high energy gamma ray (from the interior nuclear material) and the lower energy gamma ray (produced by photoelectric effect) are trapped by the spinning, electronically closed-shell molecules.

The containment of all types of gamma radiation within $C_{60}$ is approached in much the same way as alpha and beta radiation containment. Specifically, the resonant relativistic absorption principal is employed to calculate an energy balance. The gamma radiation inside the $C_{60}$ molecule (having a frequency of approximately $10^{22}$ Hz with its speed of radiation very close to or the same as speed of light) will be absorbed completely into a delocalized electron cloud (frequency equals zero) and will increase the speed of rotation at the $C_{60}$ molecule. The solution can be found according to the equation:

$$f_h = f_r x \sqrt{1 - \left(\frac{v_{r(1cm)}v}{\omega_{c_{60}}}\right)^2}$$

The variable $\omega_{c_{60}}$ represents the speed of rotation for $C_{60}$. For pure $C_{60}$, this rotation rate starts either at or below a threshold value of $2.9972 \times 10^{10}$ s$^{-1}$, depending on the material state. (This rate is referred to elsewhere in this document as approximately $3 \times 10^{10}$ s$^{-1}$) The $C_{60}$ f.c.c. solid state rotation rate is equal to the threshold value, $3 \times 10^{10}$ s$^{-1}$; liquids and gasses rotate at rates less than this value. For $C_{60}$ with included radioactive material ($X_{rad}@C_{60}$), the $\omega_{c_{60}}$ value increases as a result of the energetic influence of the gamma radiation. Very quickly, the rotation rate rises past this threshold value, thus sealing the internally-generated gamma radiation from the outside world.

Turning to X-ray and neutron radiations, both X-rays and neutrons occur far less often than alpha, beta, and gamma radiation during the storage of radioactive materials in Fullerenes. However, for completeness and to demonstrate the range of relativistic absorption, information describing $C_{60}$ containment of these two forms of radiation is provided.

X-rays come about when the orbital electrons in an atom are disrupted from their normal configuration by some excitation process, which drives that atom into an exited state for a short period of time. There is a natural tendency for the excited electrons to rearrange themselves and return the atom to its lowest energy or ground state within a time that, in a solid material, is typically a nanosecond or less. The energy liberated in such a transition from the excited to the ground state takes the form of an X-ray photon whose energy is equal to the energy difference between the initial and final states. Like beta radiation, internally-generated X-rays from an $X_{rad}@C_{60}$ complex will be trapped and contribute energy to a delocalized electron cloud surrounding the $C_{60}$.

A pure source of X-rays will radiate energy from 5.6 to 6.2 KeV. The electronic structure of molecular $C_{60}$ will absorb only 320eV from any type of pure source of radiation originating inside of the $C_{60}$ (approximately 5% of X-ray energy). This means that, when absorbing pure X-ray radiation, 95% of the X-ray energy will be contained via the resonant relativistic absorption and result in both a delocalized electron cloud and an increased speed of rotation of the $X_{rad}@C_{60}$ complex. If other additional forms of radiation are simultaneously emitted from the encapsulated material, as, for example, during internal conversion nuclear processes which yield both gamma and X-ray radiation, then greater than 95% of X-ray energy will be absorbed into the delocalized electron cloud and the increased rotation of the $C_{60}$.

Another type of X-ray radiation consists of heavy charged particles. These particles behave like alpha particles and are absorbed much the same as alpha radiation. They end up as "false helium" trapped on the inside of the cages.

The neutron is the least common type of radiation which can occur in a Fullerene molecule. Although uncommon in this storage context, the issue is addressed here for completeness.

It is well known that nuclei created with excitation energy greater than the neutron binding energy can decay by neutron emission. Radioisotope neutron sources located in a Fullerene molecule are based on either spontaneous fission or on nuclear reactions for which the incident particle is the product of a conventional decay process. Many of the transuranic heavy nuclides have an appreciable spontaneous fission decay probability.

Each fission event produces a few fast neutrons. When deliberately used as a neutron source, the isotope is encapsulated in a sufficiently thick container so that only the fast neutrons and gamma rays emerge from the source. The energy spectrum of neutrons is from 0.2 to 5 MeV, with the peak of the spectrum being between 0.5 and 1.5 MeV. Free neutrons have half lives of approximately 12 minutes, after which they each separate into a proton and an electron. When interacting with Fullerenes, the energy of the electron produced by neutron decay will fill one or more of its unoccupied molecular orbitals (LUMO), while the proton will interact through one or more occupied orbital(s) (HOMO). Energetically (similar to X-rays), a small fraction of the neutron energy (in this case less than 1%) will be absorbed by the electronic structure of $C_{60}$, but much more energy (99%) will be absorbed into the delocalized cloud and the increased rotation of $C_{60}$.

1.2 $C_{60}$ Radiation Containing Properties Depend on $C_{60}$ Rotation Rate

With all forms of harmful radioactive emissions, the ability of the $C_{60}$ molecule to trap such emissions essentially depends on the Fullerene's rate of rotation. The normal rotation rate for $C_{60}$ is $3\times10^{10}$ s$^{-1}$ in the solid state. In liquids, the rate drops significantly. For example, the reduced rotation rates are $1.8\times10^{10}$ s$^{-1}$ in Toluene and $5\times10^{9}$ s$^{-1}$ in Nitrobenzene. To contain emitting radiation, the $X_{rad}@C_{60}$ complex must rotate at speeds greater than or equal to a threshold value, which is equal to the $C_{60}$ solid state rotation rate.

If the $C_{60}$ rotation rate drops below approximately $3\times10^{10}$ s$^{-1}$ then the radiation will no longer be safely contained within the storage molecule. The slower rotation rates caused by liquid and gas states are not a problem, however, because the encapsulation of radiation-emitting materials increases the rate of rotation several orders of magnitude beyond the threshold for $C_{60}$ molecules in any form (gas, liquid, solid). This is particularly true of alpha and gamma radiation, which focus all or most of their energy into increasing the speed of rotation and less into forming delocalized electron clouds (beta and X-rays).

In order to obtain the beneficial result of containing radiation, the environment external to the $C_{60}$ storage molecule must be maintained above minimum temperatures and below maximum pressures. Only by maintaining the external environment in which the $X_{rad}@C_{60}$ complexes are stored within a range of acceptable conditions will the $X_{rad}@C_{60}$ complexes be able to maintain their extraordinarily high rates of rotation (above the threshold rate) and, thereby, mitigate the radiation hazards. If the $X_{rad}@C_{60}$ complexes are subject to external conditions such as those that exist in ocean waters at depths greater than 800 meters, then the $X_{rad}@C_{60}$ complexes will slow below the radiation release threshold (approximately $3\times10^{10}$s$^{-1}$) and the contained radiation will be released to the environment. Thus, deep ocean disposal of radioactive wastes in $C_{60}$ is not desirable when compared to other less stressing geologic disposal. However, easy to achieve, land-based storage conditions will permit the $C_{60}$ storage molecule to rotate at speeds above the radiation release threshold level and will serve to maintain the useful radiation containment function.

2.0 Fullerene Onions

Fullerene Onions are concentric carbon cages formed in layers about a central point. Fullerene onions can be used selectively to improve upon the $C_{60}$'s ability to contain radiation. For our purposes, Fullerene onions exist in two main classes; those with $C_{60}$ inside and those without $C_{60}$ as one of the inner layers. Fullerene onions containing $C_{60}$ can be further subdivided into two types, namely, those exhibiting perfect icosahedral symmetry and those not exhibiting such perfect symmetry.

The following Fullerene onions or hyperfullerenes exhibit perfect icosahedral (Ih) symmetry:

| Hyperfullerene | Inter-layer Spacing |
| --- | --- |
| $C_{60}@C_{180}$ | 0.274 nm |
| $C_{60}@C_{240}$ | 0.352 nm |
| $C_{60}@C_{540}$ | 0.701 nm |
| $C_{60}@C_{240}@C_{540}$ | 0.352–0.350 nm |

These are significant for the containment of radioactive emissions because the perfect icosahedral symmetry of their outer layers means there will be no resistance to the critical spinning motion of the inner $C_{60}$ molecule. Hence, when doped with radioactive materials, they will possess all of the radiation-trapping Doppler effect-based resonant relativistic absorption properties of pure $X_{rad}@C_{60}$.

Shells within a hyperfullerene are mobile via rotation. Indeed, the $C_{60}$ in the $C_{60}@C_{240}$ complex will rotate about the $C_5$ axis while remaining concentrically centered. As larger shells are added to these complexes, the inter-layer energy barrier decreases. Because the pentagons remain energetically aligned, energy differences in $C_{60}@C_{240}@C_{540}$ cause the $C_{240}$ to be compressed and become less round, while the $C_{540}$ expands and becomes more round. In this complex, the energy of the $C_{60}$ pentagons drives the rotation of all the shells. However, the center $C_{240}$ shell spins much slower due to the energy of the $C_{540}$ pentagons, which hinders the rotation of the second layer.

Calculations on the mobilities of the inner shell of a hyperfullerene (e.g., $C_{60}@C_{240}@C_{540}$) indicate that: 1) because of its perfect spherical shape, only the core $C_{60}$ cage can undergo absolutely centered concentric rotation in Fullerene onions and rotate at or beyond its natural solid state velocity of approximately $3\times10^{10}$ s$^{-1}$; 2) because of their polygonal shape, the rotation for larger carbon shells is strongly hindered, and 3) the $C_{60}$ translates along the $C_5$ axis freely within a distance of about 0.04 nm about its equilibrium position. Not surprisingly, the perfect Ih symmetry three-layer Fullerene onion radioactive material complex, $X_{rad}@C_{60}@C_{240}@C_{540}$, is a very appealing candidate as a Fullerene complex for long-term radioactive waste disposal. The inner $C_{60}$ will contain the radiation via Doppler-based effects (discussed above) and the outer layers, which perfectly align with the pentagonal axes, will serve to reinforce the inner $C_{60}$, which can, after many thousands of years, build up internal forces adequate to fracture $X_{rad}@C_{60}$ depending on the material being stored.

This fracturing is probable in a single layer $X_{rad}@C_{60}$ because the ongoing radioactive decay processes that occur within the $C_{60}$ storage molecule eventually can disrupt the physical integrity of the storage molecule itself. For $^{239}U@C_{60}$ and $^{243}PU@C_{60}$ (two radioactive isotopes specifically chosen because they evolve a large number of alpha and gamma particles), given the Carbon-Carbon (C-C) bond strengths available during high speed rotation, it will take approximately 72,000 years to build up sufficient internal particles and accompanying forces to cause the $C_{60}$ storage molecule to rupture ($C_{60} \rightarrow C_{58}+C_2$). At that moment, the $C_{60}$ will quickly release a significant portion of the radiation trapped during the previous 72,000 years and then forever after cease to contain emitting radiation. For $^{237}U@C_{60}$, the internal pressure builds up slower, taking approximately $10^5$ years to fracture the $C_{60}$ cage. Different isotopes will last varying times along these (exponential) lines. Some may never fracture their $C_{60}$ cages.

Even given this remarkably long duration, the eventual breakdown of these molecules is extremely undesirable. A safer alternative is to use a Fullerene onion to store the radioactive material. Fullerene onions provide the $C_{60}$ storage molecule with additional external restraint so as to enable that storage molecule to continue containing radioactive emissions beyond the expected point of rupture. In particular, for reasons of both survival through a wider range of external environmental conditions and increased duration through time, $X_{rad}@C_{60}@C_{240}@C_{540}$ ideally contains harmful high energy ionizing radiation and is well suited for use as a long-term storage mechanism. Given its internal strengths, this specific Fullerene onion will significantly increase the safe depth of ocean disposal so as to make even that disposal option feasible.

In the case of Fullerene onions which do not exhibit perfect Ih symmetry, the rotation rate of the inner $C_{60}$ may be slowed, and/or the rotation of the outer layers may be drastically increased. Further, the reinforcing properties of non-symmetrical onions are decreased, making them less desirable for permanent storage. However, such non-symmetrical onions which include a $C_{60}$ storage molecule as an inner layer may be adequate for low-level waste storage or specific high-level wastes with smaller numbers of resulting decay particulates.

Finally, even in the case of radioactive materials encapsulated within Fullerene onions that do not contain $C_{60}$, the emission of internally-generated radiation can be decreased by adding carbon layers, which act to directly absorb the radiation. While $C_{60}$ will contain or absorb all internally-generated radiation via the resonant relativistic absorption phenomena based on the Doppler effect, non-$C_{60}$ Fullerene onions having three overlapping carbon shell layers will partially absorb such radiation based on an energetic or electronic closing of the Fullerene hexagons (weak phenomenon) as well as classical absorption (weakest phenomenon).

With three or more carbon layers, each layer will overlap the others and energetically close the hexagons and seal the energy holes found in single layer carbon hexagonal arrays. But without the needed $C_{60}$ rotation, these Fullerene onions will not necessarily trap all radiation. Certainly, energetic closure of the storage molecule's hexagons will decrease the intensity of escaping radiation, but such closure will not necessarily completely eliminate it. This energetic closure of overlapping hexagons combined with multi-layering of Fullerene onions allows for the deliberate decrease of radiation escaping from the Fullerene/nuclear material storage cell.

This energetic closure and multi-layering also allows for the creation of tuned (amplitude via layering and hexagonal closure as well as frequency via the selection of the included source) radiation sources. By selecting the radiation type inserted within the Fullerene and the number of carbon layers employed, the combination can be used to provide a tuned radiation source.

3.0 Fullerene Nanotubes and Capsules

Nano-scale carbon tubules have been the subject of intensive applications research since their discovery in 1991. Here, we use these molecules to decrease the radiation released to the surrounding environment. For our radiation absorbing purposes, Fullerene nanotubes and capsules behave much like Fullerene onions which do not contain $C_{60}$ or rotate at very high speeds.

The tube structures are composed of coaxial arrays of closed graphitic sheets. In any given tube, the carbon pentagons are arranged in a helical fashion about the axis with tube-to-tube variation in the pitch angle to allow optimization of the inter-layer spacing (0.34–0.35 nm). This is slightly more than the spacing of ideal graphite and really more characteristic of turbostratic carbon. Because nanotubes and capsules do not rotate, they will not provide the Doppler-based resonant relativistic absorption phenomena exhibited by the $C_{60}$ storage molecule. However, due to the energetic closure of the hexagons by three or more carbon layers, nanotubes and capsules will decrease the radiation, but they will not necessarily stop it completely.

If we bear in mind the energetic closure of layered (three or more layers) Fullerene nanotubes and we keep in mind that some classes of nanotubules possess metallic properties, while others possess semiconducting properties, and yet others possess transitional properties between metallic and semiconducting states; then the combination of all these properties endows these nanotubes with the interesting potential of functioning as a radiation guide which serves to guide the emitted radiation along the primary axis of the tube or capsule. Thus, these materials can be used to direct the radioactive energy emitted towards a specific location or target.

4.0 Manufacturing $U@C_n$ Complexes

Experimental evidence exists for $U@C_n$ complexes formed in electric arcs. It is interesting to note that during such formation, $U@C_{28}$ and $U@C_{60}$ are the most abundantly produced clusters. Keeping in mind the special closed-shell electronic molecular structure of $C_{60}$, the abundance of $U@C_{60}$ is anticipated. Also given the fact that the process of crystallization of $C_{60}$ occurs around a point, it is reasonable to expect that one uranium atom ($U@C_{60}$) will be enclosed more frequently inside of a cage than two atoms ($U_2@C_{60}$).

However, due to the common open-shell electronic structure of $C_{28}$, the abundance of $U@C_{28}$ is less easily explained. The ground electronic state of $C_{28}$ (symmetry $T_d$) is $^5A_2$, with one electron in an $a_1$ orbital and three electrons in a $t_2$ orbital. This situation leaves dangling bonds located at each of the four carbon atoms at the tetrahedral vertices of the $T_d$ structure. The open-shell electronic structure of the $^5A_2$ ground state of $C_{28}$ is closed by the uranium atom (inside the cage) as a tetravalent atom, thereby explaining the result.

Extending these observations with simple volumetric calculations, we derive a further useful conclusion. The diameter of the ground state of $C_{60}$ is 0.71 nm; the C-C bond between $C_{60}$ and $C_{28}$ is 0.145 nm; and the longest diameter of ground state of $C_{28}$ is 0.41 nm. Thus, it is possible that $(U@C_{28})@C_{60}$ complexes can also be induced to form. The usefulness of this fact for radioactive material storage techniques is clear: Since such tetravalent atoms are naturally preferred in the formation phase and still can be encapsulated within $C_{60}$, then waste encapsulation production processes can be made more efficient.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A radiation absorbing storage molecule comprising:

a Buckminsterfullerene $C_{60}$ molecule; and a radioactive material encapsulated within the Buckminsterfullerene $C_{60}$ molecule;

wherein the $C_{60}$ molecule has an electronically closed shell and is controlled to rotate at a minimum speed of $3 \times 10^{10} s^{-1}$ to trap harmful radiation emitted by the encapsulated radioactive material.

2. A radiation absorbing storage molecule comprising:

a Fullerene onion having a Buckminsterfullerene $C_{60}$ molecule as an inner carbon cluster layer; and a radioactive material encapsulated within the Buckminsterfullerene $C_{60}$ molecules;

wherein the $C_{60}$ molecule has an electronically closed shell and rotates at a speed sufficient to trap harmful radiation emitted by the encapsuled radioactive material.

3. A radiation-absorbing molecule as claimed in claim 2, wherein the Fullerene onion has a perfect icosahedral symmetry.

4. A radiation-absorbing storage molecule as claimed in claim 2, wherein the $C_{60}$ molecule rotates at a minimum speed of $3 \times 10^{10} s^{-1}$.

5. A radiation-absorbing storage molecule as claimed in claim 2, wherein an outer shell of the Fullerene onion is a $C_{180}$ molecule.

6. A radiation-absorbing storage molecule as claimed in claim 2, wherein an outer shell of the Fullerene onion is a $C_{240}$ molecule.

7. A radiation-absorbing storage molecule as claimed in claim 2, wherein an outer shell of the Fullerene onion is a $C_{540}$ molecule.

8. A radiation-absorbing molecule as claimed in claim 2, wherein an intermediate shell of the Fullerene onion is a $C_{240}$ molecule and an outer shell of the Fullerene onion is a $C_{540}$ molecule.

9. A high energy, ionizing radiation decreasing molecule comprising:

an energetically closed storage cell having at least three carbon layers, said three carbon layers being an inner layer, an intermediate layer and an outer layer; and a radioactive material encapsulated within the inner carbon layer.

10. A molecule as claimed in claim 9 wherein, the carbon layers are formed by spherical Fullerene onion layers.

11. A molecule as claimed in claim 9, wherein the carbon layers are formed by Fullerene capsules having two closed ends.

12. A high energy, ionizing radiation directing and absorbing molecule comprising:

an energetically closed storage cell having at least three carbon layers, said three carbon layers being an inner layer, an intermediate layer and an outer layer; and a radioactive material encapsulated within the inner carbon layer;

wherein each of said three carbon layers is formed by a Fullerene nanotube having one closed end.

13. A method of creating an energetically closed Fullerene structure comprising the steps of:

forming a first carbon layer using a Fullerene molecule having a first configuration, encapsulating a radioactive material within the first carbon layer;

forming a second carbon layer around the first carbon layer using a Fullerene molecule having a configuration which is the same as the first configuration; and forming a third carbon layer around the second carbon layer using a Fullerene molecule having a configuration which is the same as the first configuration.

14. A method as claimed in claim 13, wherein the first, second, and third carbon layers are formed using Fullerene onions.

15. A method as claimed in claim 13, wherein the first, second, and third carbon layers are formed using Fullerene nanotubes.

16. A method as claimed in claim 13, wherein the first, second, and third carbon layers are formed using Fullerene capsules.

17. A method as claimed in claim 13, wherein the first carbon layer is formed using a Fullerene capsule, and the second and third carbon layers are formed using Fullerene nanotubes.

18. A method of absorbing radiation comprising the steps of:

selecting a Buckminsterfullerene $C_{60}$ molecule as a storage molecule;

encapsulating a radioactive material within the $C_{60}$ storage molecule; and controlling environmental conditions surrounding the storage molecule such that the $C_{60}$ storage molecule rotates at a minimum speed of $3 \times 10^{10} s^{-1}$.

19. A method of optimizing the production of $C_{60}$ Fullerene molecules encapsulating radioactive materials comprising the step of using a tetravalent Fullerene to initiate the formation of $C_{60}$ shells.

20. A method as claimed in claim 19, wherein the tetravalent Fullerene is $U@C_{28}$.

* * * * *